United States Patent
Hsieh

(10) Patent No.: US 12,143,229 B2
(45) Date of Patent: Nov. 12, 2024

(54) METHOD AND NON-TRANSITORY COMPUTER-READABLE STORAGE MEDIUM AND APPARATUS FOR TRANSMITTING WIRELESS MULTI-CHANNEL DATA

(71) Applicant: Airoha Technology Corp., Hsinchu (TW)

(72) Inventor: Ming-Yi Hsieh, Hsinchu (TW)

(73) Assignee: AIROHA TECHNOLOGY CORP., Hsinchu (TW)

(*) Notice: Subject to any disclaimer, the term of this patent is extended or adjusted under 35 U.S.C. 154(b) by 456 days.

(21) Appl. No.: 17/570,815

(22) Filed: Jan. 7, 2022

(65) Prior Publication Data
US 2022/0240018 A1    Jul. 28, 2022

Related U.S. Application Data

(60) Provisional application No. 63/140,474, filed on Jan. 22, 2021.

(30) Foreign Application Priority Data

Dec. 3, 2021 (CN) .......................... 202111464673.9

(51) Int. Cl.
*H04L 1/1867* (2023.01)
*H04L 1/08* (2006.01)
(Continued)

(52) U.S. Cl.
CPC ................ *H04L 1/189* (2013.01); *H04L 1/08* (2013.01); *H04L 1/1607* (2013.01);
(Continued)

(58) Field of Classification Search
CPC ......... H04L 1/189; H04L 1/08; H04L 1/1607; H04W 4/80; H04W 84/20; H04R 1/1016;
(Continued)

(56) References Cited

U.S. PATENT DOCUMENTS

| | | |
|---|---|---|
| 2010/0235285 A1 | 9/2010 | Hoffberg |
| 2014/0233662 A1 | 8/2014 | Hansell et al. |

(Continued)

FOREIGN PATENT DOCUMENTS

| | | |
|---|---|---|
| CN | 105229886 A | 1/2016 |
| CN | 111464988 A | 7/2020 |

(Continued)

OTHER PUBLICATIONS

English translation of Taiwanese Search Report for Taiwanese Application No. 110145319, dated Sep. 8, 2022.

*Primary Examiner* — Chi Tang P Cheng
(74) *Attorney, Agent, or Firm* — Birch, Stewart, Kolasch & Birch, LLP

(57) ABSTRACT

The invention relates to methods, non-transitory computer-readable storage medium, and apparatus for transmitting wireless multi-channel data. A method for transmitting wireless multi-channel data, which is performed by a processing unit of a wireless master device, includes: determining a first physical channel to be jumped into for a first wireless slave device, and a second physical channel to be jumped into for a second wireless slave device; and when the first physical channel is different from the second physical channel, transmitting a first media packet to the first wireless slave device in the first physical channel and a second media packet to the second wireless slave device in the second physical channel (Continued)

in a transmission slot of a subevent. The first wireless slave device and the second wireless slave device are peer devices with each other.

20 Claims, 5 Drawing Sheets

(51) Int. Cl.
*H04L 1/1607* (2023.01)
*H04R 1/10* (2006.01)
*H04R 5/033* (2006.01)
*H04R 5/04* (2006.01)
*H04S 3/00* (2006.01)
*H04W 4/80* (2018.01)
*H04W 84/20* (2009.01)

(52) U.S. Cl.
CPC ........... *H04R 1/1016* (2013.01); *H04R 5/033* (2013.01); *H04R 5/04* (2013.01); *H04S 3/008* (2013.01); *H04W 4/80* (2018.02); *H04R 2420/07* (2013.01); *H04S 2400/01* (2013.01); *H04W 84/20* (2013.01)

(58) Field of Classification Search
CPC ...... H04R 5/033; H04R 5/04; H04R 2420/07; H04S 3/008; H04S 2400/01
USPC ......................................................... 370/458
See application file for complete search history.

(56) References Cited

U.S. PATENT DOCUMENTS

| 2014/0348327 | A1* | 11/2014 | Linde ..................... H04W 4/80 381/2 |
| 2015/0304770 | A1 | 10/2015 | Watson et al. |
| 2017/0054763 | A1 | 2/2017 | Pedersen et al. |
| 2020/0344004 | A1* | 10/2020 | Jo ......................... H04W 28/04 |
| 2021/0014081 | A1* | 1/2021 | Guo ................. H04L 12/40123 |
| 2023/0016757 | A1 | 1/2023 | Xu |

FOREIGN PATENT DOCUMENTS

| CN | 112188415 A | 1/2021 |
| TW | 201438004 A | 10/2014 |
| WO | WO 2014/126991 A1 | 8/2014 |

* cited by examiner

METHOD AND NON-TRANSITORY COMPUTER-READABLE STORAGE MEDIUM AND APPARATUS FOR TRANSMITTING WIRELESS MULTI-CHANNEL DATA

CROSS-REFERENCE TO RELATED APPLICATIONS

This application claims the benefit of priority to U.S. Provisional Application Ser. No. 63/140,474, filed on Jan. 22, 2021; and Patent Application No. 202111464673.9, filed in China on Dec. 3, 2021; the entirety of which is incorporated herein by reference for all purposes.

BACKGROUND

The disclosure generally relates to wireless transmission and, more particularly, to methods, non-transitory computer readable storage media and apparatuses for transmitting multi-channel data.

Wireless audio output devices use Bluetooth connectivity to receive audio signal by radio waves from source devices, such as personal computers, tablet computers, mobile phones, audio players, etc. How to improve the data transmission rate has always been an important issue. Therefore, it is desirable to have methods, non-transitory computer readable storage media and apparatuses for transmitting multi-channel data to increase the data transmission rate.

SUMMARY

The disclosure relates to an embodiment of a method for transmitting wireless multi-channel data, which is performed by a processing unit of a wireless master device, to include: determining a first physical channel to be jumped into for a first wireless slave device, and a second physical channel to be jumped into for a second wireless slave device; and when the first physical channel is different from the second physical channel, transmitting a first media packet to the first wireless slave device in the first physical channel and a second media packet to the second wireless slave device in the second physical channel in a transmission slot of a subevent.

The disclosure further relates to an embodiment of a non-transitory computer-readable storage medium when loaded and executed by a processing unit of a wireless master device to perform a method for transmitting wireless multi-channel data as described above.

The disclosure further relates to an embodiment of an apparatus for transmitting wireless multi-channel data, installed in a wireless determine a first physical channel to be jumped into for a first wireless slave device, and a second physical channel to be jumped into for a second wireless slave device; and when the first physical channel is different from the second physical channel, transmit a first media packet to the first wireless slave device in the first physical channel and a second media packet to the second wireless slave device in the second physical channel in a transmission slot of a subevent.

The first wireless slave device and the second wireless slave device are peer devices with each other Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words described the relationship between elements should be interpreted in a like fashion (e.g., "between" versus "directly between," "adjacent" versus "directly adjacent." etc.)

Figure 1:
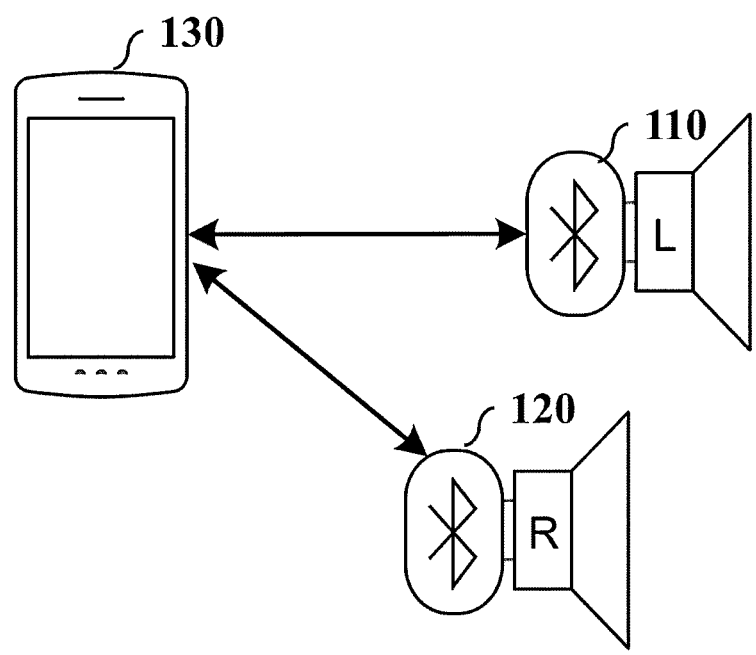
FIG. 1 is a schematic diagram of wireless communications according to an embodiment of the invention.

Refer to FIG. 1. In a scenario, a user listens to audio signals received from the mobile phone 130 through wireless earbuds. The wireless earbuds are a pair of apparatuses with wireless communications capabilities, including a left wireless earbud 110 and a right wireless earbud 120, and no physical wire line is connected between the left wireless earbud 110 and the right wireless earbud 120. It may use a wireless communications protocol, such as Bluetooth low energy Audio (LE Audio), etc., to transfer packets carrying audio signals between the mobile phone 130 and the left wireless earbud 110 and between the mobile phone 130 and the right wireless earbud 120. In some embodiments, the left wireless earbud 110 and the right wireless earbud 120 may receive media packets including left channel and right channel of stereo data, respectively. The left wireless earbud 110 and the right wireless earbud 120 are peer devices with each other.

In LE audio, the mobile phone 130 may establish different connection-oriented isochronous channels with the left wireless earbud 110 and the right wireless earbud 120, respectively, and each channel uses the LE Connected Isochronous Stream (LE-CIS) logical transport and supports bi-directional communication.

The two CISs form a connected isochronous group (CIG) and each CIS has multiple CIS instances. The CIS instances in the same CIG have common timing reference data, which is used in the synchronization of isochronous data processed by the left wireless earbud 110 and the right wireless earbud 120. Within the CIG, and for each CIS, there exists a schedule of transmission (TX) and reception (RX) time slots referred to as events and subevents.

Each event occurs with a regular interval called the ISO interval, which may be set in the range from 5 ms to 4 s in multiple of 1.25 ms. Each event is divided into one or more subevents. Each subevent contains a transmission slot and a reception slot. Taking the mobile phone 130 as an example, during each subevent in a CIS, the mobile phone 130 may transmit a media packet to the left wireless earbud 110 or the right wireless earbud 120 in a TX slot, and the left wireless earbud 110 or the right wireless earbud 120 may reply with a response packet to the mobile phone 130 in a RX slot. The media packet may indicate a packet including a link layer data protocol data unit (LL data PDU) for carrying left-channel or right-channel data. The response packet may be an empty packet including information of acknowledgement (ACK) or negative-acknowledgement (NAK).

Figure 2:
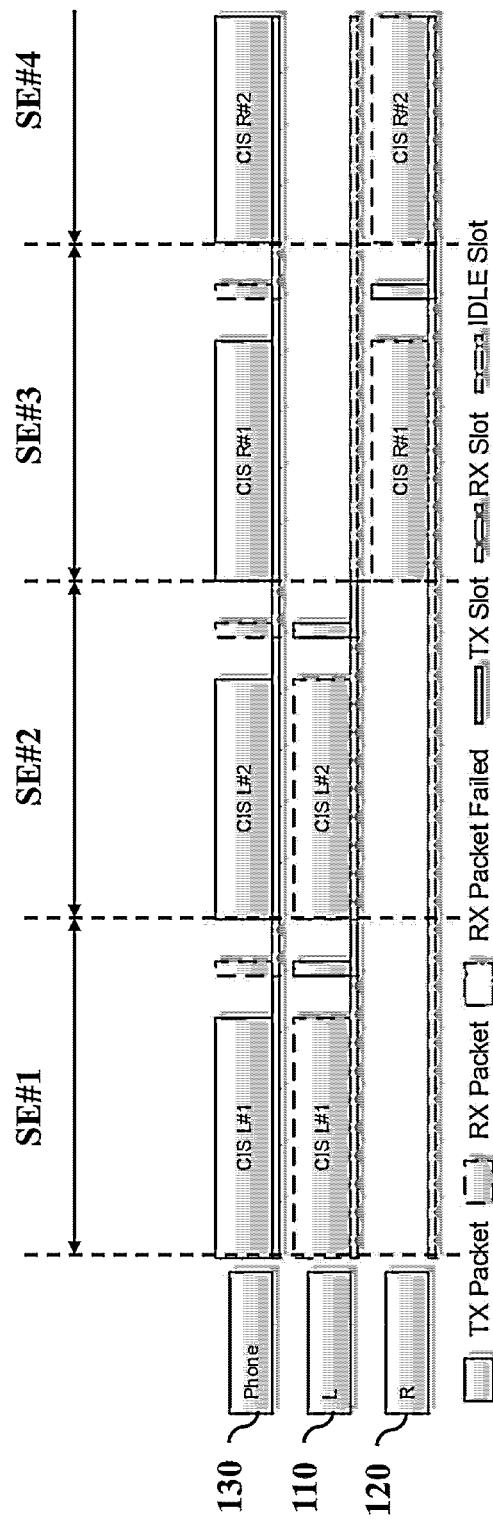
FIG. 2 is a timing diagram for transmitting Low Energy Connected Isochronous Stream (LE-CIS) according to some implementations.

Referring to the LE-CIS setting of FIG. 2, the mobile phone 130 may schedule the CIS transmitted to the left wireless earbud 110 and the right wireless earbud 120 as 1T1R, where in 1T1R, T represents transmission and R represents reception. In an operation, the mobile phone 130 transmits CIS left-channel data L #1 and L #2 to the left wireless earbud 110 in the subevents SE #1 and SE #2. But for the right wireless earbud 120, the times slots in the subevents SE #1 and SE #2 are IDLE slots. The mobile phone 130 transmits CIS right-channel data R #1 and R #2 to the right wireless earbud 120 in the subevents SE #3 and SE #4. But for the left wireless earbud 110, the times slots in the subevents SE #3 and SE #4 are IDLE slots. Typically, the left wireless earbud 110 and the right wireless earbud 120 enter a sleep state when idle to save battery power consumption. However, these IDLE slots would reduce the transmission rate of wireless data, resulting in longer data transmission time.

Additionally, the mobile phone 130 may establish a connectionless isochronous channel with the left wireless earbud 110 and the right wireless earbud 120, and the channel uses two LE Broadcast Isochronous Stream (LE-BIS) logical transports and supports uni-directional communication.

The two BISs form a broadcast isochronous group (BIG), and each BIG has multiple BIS instances. The BIS instances in the same BIG have common timing reference data, which is used in the synchronization of broadcast isochronous data processing by the left wireless earbud 110 and the right wireless earbud 120. Each BIS may be used by multiple wireless receivers. Each BIS instance has its unique access address and uses the designated channel map to transmit media packets. For each BIS, there exists a schedule of transmission time slots referred to as events and sub events.

Each event occurs with a regular ISO interval. Each event is divided into one or more subevents. Each subevent contains one TX slot. Taking the mobile phone 130 as an example, during each subevent in a BIS, the mobile phone 130 may transmit a media packet to the left wireless earbud 110 or the right wireless earbud 120 in a TX slot of the mobile phone 130. In addition, the retransmission number (RTN) is set for each BIS. For example, when RTN=1, it means that each media packet will be retransmitted once.

For the LE-BIS setting, the mobile phone 130 may schedule the BIS transmitted to the left wireless earbud 110 and the right wireless earbud 120 as 1T. For example, the mobile phone 130 transmits CIS left-channel data L #1 to the left wireless earbud 110 in the subevent SE #1 and retransmits CIS left-channel data L #1 to the left wireless earbud 110 in the subevent SE #2. But for the right wireless earbud 120, the times slots in the subevents SE #1 and SE #2 are IDLE slots. The mobile phone 130 transmits CIS right-channel data R #1 to the right wireless earbud 120 in the subevent SE #3 and retransmits CIS right-channel data R #1 to the right wireless earbud 120 in the subevent SE #4. But for the left wireless earbud 110, the times slots in the subevents SE #3 and SE #4 are IDLE slots. Typically, the left wireless earbud 110 and the right wireless earbud 120 enter a sleep state when idle to save battery power consumption. However, these IDLE slots would reduce the transmission rate of wireless data, resulting in longer data transmission time.

To increase the wireless transmission rate, an embodiment of the invention introduces a wireless transmission mechanism of multi-channel data implemented in the mobile phone 130, which reduces IDLE slots of the left wireless earbud 110 and right wireless earbud 120 as many as possible, so that the left wireless earbud 110 and the right wireless earbud 120 would simultaneously receive media packets carrying left-channel and right-channel data, respectively, to increase the data transmission rate. Additionally, in the system architecture of the coexistence of Bluetooth and Wi-Fi modules, since the wireless transmission mechanism of multi-channel data shortens the time for transmitting multi-channel data to the left wireless earbud 110 and the right wireless earbud 120 (i.e., because the operating time of the Bluetooth module is reduced), it would release more time for the Wi-Fi module to use, or reduce the collision rate of the medium used between the Bluetooth module and the Wi-Fi module.

Figure 3:
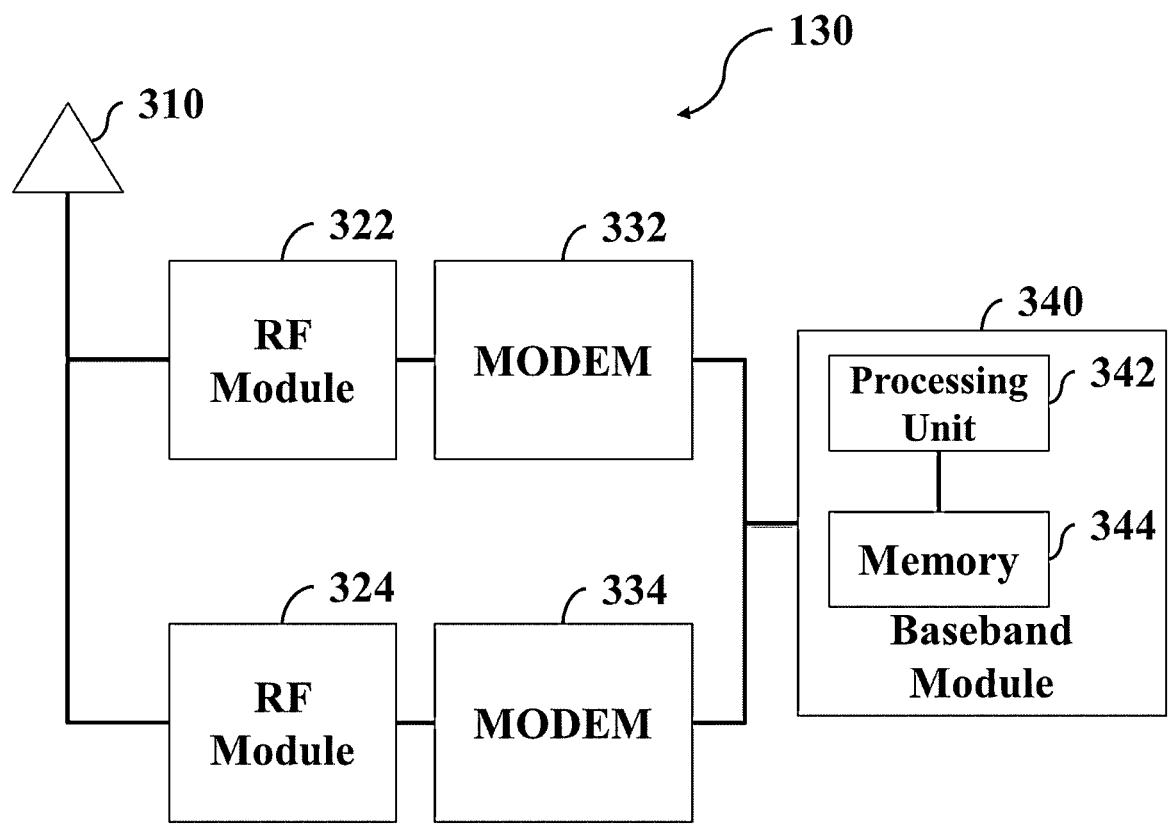
FIG. 3 is the system architecture installed in the mobile phone according to an embodiment of the invention.

Refer to FIG. 3 showing the system architecture. The system architecture may be implemented in the mobile phone 130 including the antenna 310, the RF modules 322 and 324, the modulator-demodulator (MODEM) 332 and 334, and the baseband module 340. The baseband module 340 includes the processing unit 342 and the memory 344. The processing unit 342 may be implemented in numerous ways, such as with general-purpose hardware (e.g., a microcontroller unit, a digital signal processor, a single processor, multiple processors or graphics processing units capable of parallel computations, or others) that is programmed using firmware and/or software instructions to perform the functions recited herein. The memory 344 may allocate space as a data buffer temporarily storing the media packet(s) to the mobile phone 130. The memory 344 further stores data needed during execution, such as variables, data tables, and so on. The processing unit 342 may couple the memory 344 to access data through a bus architecture.

The antenna 310, the RF module 322 and the MODEM 332 are employed to send media packets carrying left channel-data to the left wireless earbud 110 through the medium, and if necessarily, receive response packets from the left wireless earbud 110. The antenna 310, the RF module 324 and the MODEM 334 are employed to send media packets carrying right channel-data to the right wireless earbud 120 through the medium, and if necessarily, receive response packets from the right wireless earbud 120.

Although FIG. 3 illustrating one antenna 310 shared by the RF modules 322 and 324, the artisans may practice the RF modules 322 and 324 to use different antennas, and the invention should not be limited thereto.

In adaptive frequency hopping (AFH), the mobile phone 130 may send the same channel map or different channel maps to the left wireless earbud 110 and the right wireless earbud 120. Each channel map includes information indicating good and bad physical channels. The channel map instructs the left wireless earbud 110 or the right wireless earbud 120 to use the specified one of good physical channels (for example, at most 37) in the 2.4 to 2.48 GHz frequency band in each time interval (or time slot) to receive data or transmit data.

The RF modules 322 and 324 may use the designated physical channels to receive or transmit data, respectively, in each time interval according to different channel maps. It should be noted that different channel maps may instruct the left wireless earbud 110 and the right wireless earbud 120 to jump into the same or different physical channels in the same time interval, and the collision rate is approximately between 5% and 10%.

The RF modules 322 and 324 are employed to receive RF signals in the medium and convert the received RF signals into baseband signals that can be processed by the MODEM 332 and 334, respectively. The RF modules 322 and 324 are also employed to receive baseband signals from the MODEMs 332 and 334, and convert the received baseband signals into the RF signals that can be sent to the left wireless earbud 110 and the right wireless earbud 120, respectively.

Any of the RF modules 322 and 324 includes a transmitter and a receiver. The transmitter may include a power amplifier (PA) to convert a lower-power RF signal into a higher power signal and drives the antenna 310 to transmit data. The receiver may include a low-noise amplifier (LNA) and a mixer. The LNA amplifies a very low-power signal, which is received through the antenna 310, without significantly degrading its signal-to-noise ratio. The mixer generates a new frequency according to the input signal, and the signal output from a local oscillator. Any of the MODEMs 332 and 334 may implement Gaussian Frequency Shift Keying (GFSK), π/4-Differenttial Quadrature Phase Shift Keying (DQPSK), 8-Differential Phase Shift Keying (DPSK), or others.

The transmitter in the RF module 322 and the modulator in the MODEM 332 may form a Bluetooth transmission path corresponding to the left wireless earbud 110, and the transmitter in the RF module 324 and the modulator in the MODEM 334 may form a Bluetooth transmission path corresponding to the right wireless earbud 120. The receiver in the RF module 322 and the demodulator in the MODEM 332 may form a Bluetooth reception path corresponding to the left wireless earbud 110, and the receiver in the RF module 324 and the demodulator in the MODEM 334 may form a Bluetooth reception path corresponding to the right wireless earbud 120.

Although the aforementioned embodiments describe the network formed by the mobile phone 130 (also called the wireless master device), the left wireless earbud 110 and the right wireless earbud 120 (also called the wireless slave devices), but this is only for illustration and not for limiting the present invention. Those artisans may realize the method for transmitting multi-channel data of the present invention to a wireless audio network or other similar networks. The wireless audio network may include one wireless master device and at least two wireless slave devices. The wireless master device may be, for example, a personal computer, a laptop PC, a tablet computer, a mobile phone, or other electronic products, and the wireless slave devices may include, for example, a left speaker and a right speaker each containing a Bluetooth transmission module.

Accompanying with the system architecture as shown in FIG. 3, an embodiment of the invention introduces a method for transmitting wireless multi-channel data, which transmits media packets carrying left-channel and right-channel data to the left wireless earbud 110 and the right wireless earbud 120 through two paths, respectively. Each path includes a RF module and a MODEM. The method is aimed at the TX slot of one subevent and is implemented by the processing unit 342 of the mobile phone 130 when loading and executing suitable firmware and/or software code. Refer to detailed steps shown in FIG. 4:

Step S410: The first and the second physical channels to be jumped into are determined for the left wireless earbud 110 and the right wireless earbud 120, respectively. In some embodiments, the processing unit 342 may generate one channel map and store the channel map in the memory 344. Next, the left wireless earbud 110 and the right wireless earbud 120 use different frequency-hopping algorithms to determine the first and the second physical channels to be jumped into, respectively, according to the same channel map. In alternative embodiments, the processing unit 342 may generate different channel maps for the left wireless earbud 110 and the right wireless earbud 120 and store the channel maps in the memory 344. Next, the left wireless earbud 110 and the right wireless earbud 120 use the same frequency-hopping algorithm to determine the first and the second physical channels according to different channel maps, respectively. The processing unit 342 may provide (or update) the channel maps to the left wireless earbud 110 and the right wireless earbud 120 through the RF modules 322 and 324, respectively, at a proper time point. Additionally, the frequency-hopping algorithm(s) employed in the left wireless earbud 110 and the right wireless earbud 120 are preset, and match/matches the frequency-hopping algorithm employed in the mobile phone 130.

Step S420: It is determined whether the first physical channel is the same as the second physical channel. If so, the process proceeds to step S430. Otherwise, the process proceeds to step S460. It means that the physical channel collision will occur and the processing unit 342 can only choose to transmit the media packet to one of the left wireless earbud 110 and the right wireless earbud 120 when the first and the second physical channels are the same.

Step S430: It is determined whether the number of retransmissions of the left wireless earbud 110 is higher than or equal to the number of retransmissions of the right wireless earbud 120. If so, the process proceeds to step S440. Otherwise, the process proceeds to step S450. The processing unit 342 may maintain two counters in the memory 344, which records the numbers of retransmissions of the left wireless earbud 110 and the right wireless earbud 120. Regarding the retransmission operation, for example, in any subevent, when discovering that the next expected sequence number (NESN) in the response packet is equal to the sequence number (SN) in the media packet that has been transmitted, the processing unit 342 determines that the response packet contains NAK information and the mobile phone 130 retransmits this media packet to the corresponding wireless earbud in the next subevent. Otherwise, the processing unit 342 determines that the response packet contains ACK information. After retransmitting this media packet to the left wireless earbud 110 or the right wireless earbud 120, the processing unit 344 increases the counter corresponding to the received wireless earbud by one.

Step S440: In the TX slot of this subevent, the media packet corresponding to the left wireless earbud 110 is transmitted to the left wireless earbud 110 in the jumped physical channel through the corresponding Bluetooth transmission path. It is to be noted that, when discovering that the access address of the media packet is not its own access address, the right wireless earphone 120 would automatically discard the media packet.

Step S450: In the TX slot of this subevent, the media packet corresponding to the right wireless earbud 120 is transmitted to the right wireless earbud 120 in the jumped physical channel through the corresponding Bluetooth transmission path. It is to be noted that, when discovering that the access address of the media packet is not its own access address, the left wireless earphone 110 would automatically discard the media packet.

The judgment in step S430 and the consequent operations in steps S440 and S450 represent a collision handling policy with priority to the worse channel, and the number of retransmissions is used as the criterion for judgment.

Step S460: In the TX slot of this subevent, different media packets corresponding to the left wireless earbud 110 and the right wireless earbud 120 are transmitted to the left wireless earbud 110 and the right wireless earbud 120 in the first and the second physical channels, respectively. Each of the media packets is transmitted through the corresponding Bluetooth transmission paths.

It should be noted that any one of the media packets transmitted in steps S440, S450, and S460 may be the first transmitted or retransmitted media packet.

Figure 5:
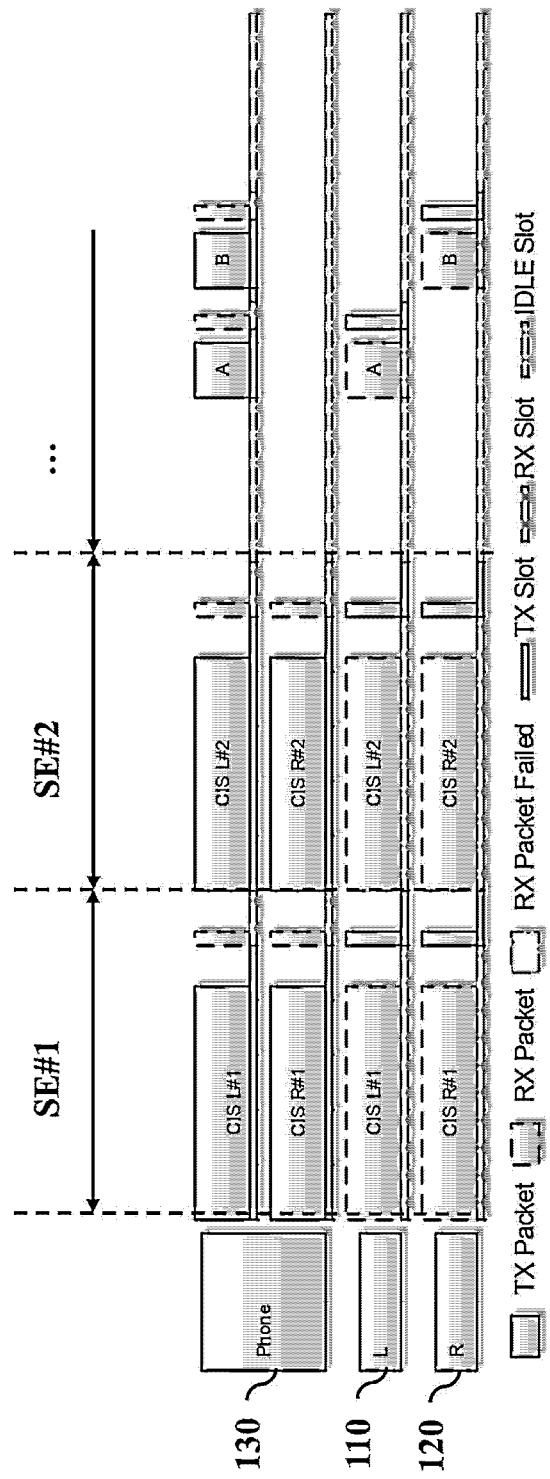
FIG. 5 is a timing diagram for transmitting LE-CIS according to an embodiment of the invention.

Taking the setting of LE-CIS as an example, refer to FIG. 5. In the case of no physical channel collision, the mobile phone 130 can transmit the media packet carrying the left-channel data L #1 to the left wireless earbud 110 and the media packet carrying the right-channel data R #1 to the right wireless earbud 120 in the TX slot of the subevent SE #1 (step S460), and transmit the media packet carrying the left-channel data L #2 to the left wireless earbud 110 and the media packet carrying the right-channel data R #2 to the right wireless earbud 120 in the TX slot of the subevent SE #2 (step S460).

Figure 4:
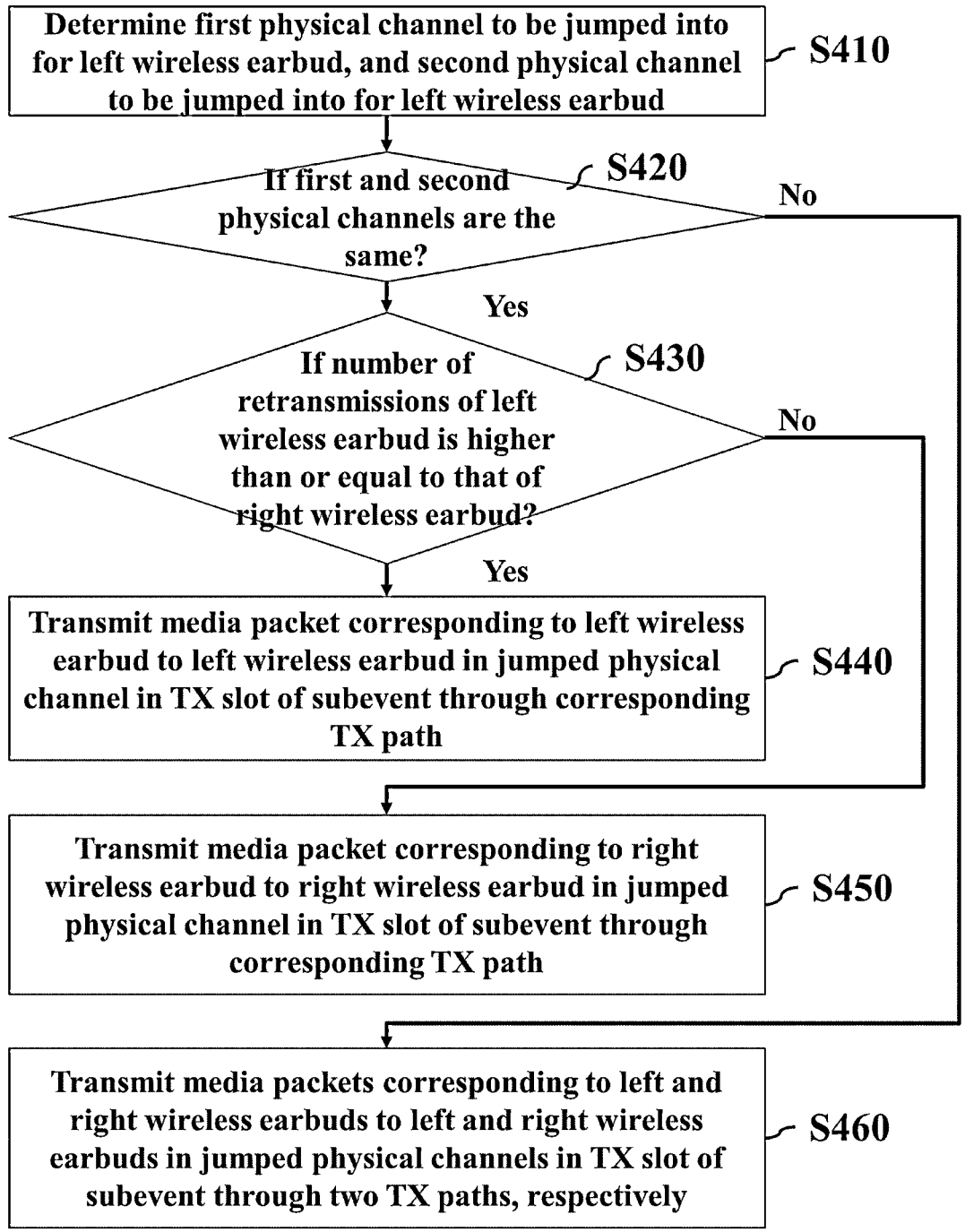
FIG. 4 is a flowchart of a method for transmitting wireless multi-channel data according to an embodiment of the present invention.

In the setting of BIS, the mobile phone 130, the left wireless earbud 110 and the right wireless earbud 120 may also be operated in accordance with the detailed steps shown in FIG. 4. Although the BIS setting is not the same as the CIS setting as a whole, the designated part of the BIS setting used in the present invention is substantially the same as the designated part of the CIS setting, so for the sake of brevity, the details are not repeated.

Although the embodiments describe the transmission of stereo data as an example above, those artisans may devise the technical solutions to support the transmission of other multi-channel data, such as 3 channels, 2.1 channels, 5.1 channels, etc., by expanding the number of Bluetooth transmission paths and reception paths and appropriately modifying the method shown in FIG. 4, and the invention should not be limited thereby.

Some or all of the aforementioned embodiments of the method of the invention may be implemented in a computer program, such as a driver of a dedicated hardware, digital signal processor (DSP) code in a specific programming language, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIG. 3, it should be noted that additional elements may be included to achieve better performance without departing from the spirit of the invention. Each element of FIG. 3 is composed of various circuits and arranged to operably perform the aforementioned operations. While the process flows described in FIG. 4 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for transmitting wireless multi-channel data, performed by a processing unit of a wireless master device, comprising:

determining a first physical channel to be jumped into for a first wireless slave device, and a second physical channel to be jumped into for a second wireless slave device;

when the first physical channel is different from the second physical channel, transmitting a first media packet to the first wireless slave device in the first physical channel and a second media packet to the second wireless slave device in the second physical channel in a transmission slot of a subevent; and when the first physical channel is the same as the second physical channel, transmitting the first media packet to the first wireless slave device in the first physical channel in the transmission slot of the subevent or transmitting the second media packet to the second wireless slave device in the second physical channel in the transmission slot of the subevent according to a first number of retransmissions of the first wireless slave device and a second number of retransmissions of the second wireless slave device, wherein the first wireless slave device and the second wireless slave device are peer devices with each other.

2. The method of claim 1, comprising:

when the first physical channel is the same as the second physical channel and the first number of retransmissions of the first wireless slave device is higher than or equal to the second number of retransmissions of the second wireless slave device, transmitting the first media packet to the first wireless slave device in the first physical channel in the transmission slot of the subevent; and when the first physical channel is the same as the second physical channel and the first number of retransmissions of the first wireless slave device is lower than the second number of retransmissions of the second wireless slave device, transmitting the second media packet to the second wireless slave device in the second physical channel in the transmission slot of the subevent.

3. The method of claim 1, wherein a logical transport of a first connected isochronous stream is used between the wireless master device and the first wireless slave device, a logical transport of a second connected isochronous stream is used between the wireless master device and the second wireless slave device, and the first connected isochronous stream and the second connected isochronous stream form a connected isochronous group.

4. The method of claim 1, wherein a logical transport of a first broadcast isochronous stream is used between the wireless master device and the first wireless slave device, and a logical transport of a second broadcast isochronous stream is used between the wireless master device and the second wireless slave device, and the first broadcast isochronous stream and the second broadcast isochronous stream form a broadcast isochronous group.

5. The method of claim 1, wherein the first media packet is transmitted to the first wireless slave device through a first Bluetooth transmission path of the wireless master device, and the second media packet is transmitted to the second wireless slave device through a second Bluetooth transmission path of the wireless master device.

6. The method of claim 5, wherein the first Bluetooth transmission path comprises a first transmitter and a first modulator, and the second Bluetooth transmission path comprises a second transmitter and a second modulator.

7. A non-transitory computer-readable storage medium for transmitting wireless multi-channel data when loaded and executed by a processing unit of a wireless master device, the non-transitory computer-readable storage medium comprising program code to:
  determine a first physical channel to be jumped into for a first wireless slave device, and a second physical channel to be jumped into for a second wireless slave device;
  when the first physical channel is different from the second physical channel, transmit a first media packet to the first wireless slave device in the first physical channel and a second media packet to the second wireless slave device in the second physical channel in a transmission slot of a subevent; and
  when the first physical channel is the same as the second physical channel, transmit the first media packet to the first wireless slave device in the first physical channel in the transmission slot of the subevent or transmit the second media packet to the second wireless slave device in the second physical channel in the transmission slot of the subevent according to a first number of retransmissions of the first wireless slave device and a second number of retransmissions of the second wireless slave device,
  wherein the first wireless slave device and the second wireless slave device are peer devices with each other.

8. The non-transitory computer-readable storage medium of claim 7, comprising program code to:
  when the first physical channel is the same as the second physical channel and the first number of retransmissions of the first wireless slave device is higher than or equal to the second number of retransmissions of the second wireless slave device, transmit the first media packet to the first wireless slave device in the first physical channel in the transmission slot of the subevent; and
  when the first physical channel is the same as the second physical channel and the first number of retransmissions of the first wireless slave device is lower than the second number of retransmissions of the second wireless slave device, transmit the second media packet to the second wireless slave device in the second physical channel in the transmission slot of the subevent.

9. The non-transitory computer-readable storage medium of claim 7, wherein a logical transport of a first connected isochronous stream is used between the wireless master device and the first wireless slave device, a logical transport of a second connected isochronous stream is used between the wireless master device and the second wireless slave device, and the first connected isochronous stream and the second connected isochronous stream form a connected isochronous group.

10. The non-transitory computer-readable storage medium of claim 7, wherein a logical transport of a first broadcast isochronous stream is used between the wireless master device and the first wireless slave device, and a logical transport of a second broadcast isochronous stream is used between the wireless master device and the second wireless slave device, and the first broadcast isochronous stream and the second broadcast isochronous stream form a broadcast isochronous group.

11. The non-transitory computer-readable storage medium of claim 7, wherein the first media packet is transmitted to the first wireless slave device through a first Bluetooth transmission path of the wireless master device, and the second media packet is transmitted to the second wireless slave device through a second Bluetooth transmission path of the wireless master device.

12. The non-transitory computer-readable storage medium of claim 11, wherein the first Bluetooth transmission path comprises a first transmitter and a first modulator, and the second Bluetooth transmission path comprises a second transmitter and a second modulator.

13. The non-transitory computer-readable storage medium of claim 7, comprising program code to:
  increase a first counter corresponding to the first wireless slave device by one when receiving a first respond packet comprising negative-acknowledgement (NAK) information, which corresponds to the first media packet; and
  increase a second counter corresponding to the second wireless slave device by one when receiving a second respond packet comprising NAK information, which corresponds to the second media packet.

14. An apparatus for transmitting wireless multi-channel data, installed in a wireless master device, comprising:
  a processing unit, arranged operably to: determine a first physical channel to be jumped into for a first wireless slave device, and a second physical channel to be jumped into for a second wireless slave device; when the first physical channel is different from the second physical channel, transmit a first media packet to the first wireless slave device in the first physical channel and a second media packet to the second wireless slave device in the second physical channel in a transmission slot of a subevent; and when the first physical channel is the same as the second physical channel, transmit the first media packet to the first wireless slave device in the first physical channel in the transmission slot of the subevent or transmit the second media packet to the second wireless slave device in the second physical channel in the transmission slot of the subevent according to a first number of retransmissions of the first wireless slave device and a second number of retransmissions of the second wireless slave device, wherein the first wireless slave device and the second wireless slave device are mutually peer devices.

15. The apparatus of claim 14, wherein the processing unit is arranged operably to: when the first physical channel is the same as the second physical channel and the first number of retransmissions of the first wireless slave device is higher than or equal to the second number of retransmissions of the second wireless slave device, transmit the first media packet to the first wireless slave device in the first physical channel in the transmission slot of the subevent; and when the first physical channel is the same as the second physical channel and the first number of retransmissions of the first wireless slave device is lower than the second number of retransmissions of the second wireless slave device, transmit the second media packet to the second wireless slave device in the second physical channel in the transmission slot of the subevent.

16. The apparatus of claim 14, wherein a logical transport of a first connected isochronous stream is used between the wireless master device and the first wireless slave device, a logical transport of a second connected isochronous stream is used between the wireless master device and the second wireless slave device, and the first connected isochronous stream and the second connected isochronous stream form a connected isochronous group.

17. The apparatus of claim 14, wherein a logical transport of a first broadcast isochronous stream is used between the wireless master device and the first wireless slave device, and a logical transport of a second broadcast isochronous stream is used between the wireless master device and the second wireless slave device, and the first broadcast isochronous stream and the second broadcast isochronous stream form a broadcast isochronous group.

18. The apparatus of claim 14, comprising:
 a first Bluetooth transmission path, coupled to the processing unit, arranged operably to transmit the first media packet to the first wireless slave device; and
 a second Bluetooth transmission path, coupled to the processing unit, arranged operably to transmit the second media packet to the second wireless slave device.

19. The apparatus of claim 18, wherein the first Bluetooth transmission path comprises a first transmitter and a first modulator, and the second Bluetooth transmission path comprises a second transmitter and a second modulator.

20. The apparatus of claim 14, wherein the processing unit is arranged operably to: increase a first counter corresponding to the first wireless slave device by one when receiving a first respond packet comprising negative-acknowledgement (NAK) information, which corresponds to the first media packet; and increase a second counter corresponding to the second wireless slave device by one when receiving a second respond packet comprising NAK information, which corresponds to the second media packet.

* * * * *